Patented Jan. 6, 1953

2,624,714

UNITED STATES PATENT OFFICE 2,624,714

POLYMERIZABLE POLYESTER COMPOSITIONS

Maurice H. Bigelow, Toledo, Ohio, assignor to Libbey-Owens-Ford Glass Company, Toledo, Ohio, a corporation of Ohio No Drawing. Application January 6, 1950, Serial No. 137,273

10 Claims. (Cl. 260—9)

The invention relates to the preparation of polymerizable unsaturated polyester compositions having improved physical and chemical properties, and to the preparation of polymerized materials therefrom having improved resistance to abrasion.

A polymerizable unsaturated polyester (i. e., a polymerizable unsaturated polyhydric alcohol-polycarboxylic acid polyester) is highly advantageous as a starting material for the production of hardened synthetic resins in that it is resinous in character before polymerization, and is fusible at a temperature at which polymerization is not rapid. Other heat-hardenable compositions, such as urea-formaldehyde and phenol-formaldehyde compositions, are much more difficult to fabricate because they do not exist as plastic resins at temperatures much below their hardening temperatures. Since a heat-hardenable composition can be shaped only while it is in a fused condition, the failure of other heat-hardenable compositions to reach a fused state below their hardening temperatures is a great handicap in fabricating operations. By the time a urea-formaldehyde or phenol-formaldehyde composition has reached a fused state in a fabricating operation, its hardening already has begun, so that the hardening interferes with the shaping or molding of the composition.

Still other heat-hardenable compositions, such as diallyl esters, have low melting points or are liquids at room temperature, but have the disadvantage that they do not attain a resinous state until after hardening has begun. Such compositions cannot be handled satisfactorily in the resinous state that they attain after hardening has begun because the hardening, once it has started, is very difficult to stop. Because of the difficulty of controlling the hardening of compositions such as diallyl esters once the hardening has reached the stage at which the compositions are resinous, such compositions ordinarily are shaped only by the casting method, which is the sole method by which they can be handled in non-resinous liquid form.

A polymerizable polyester is resinous because it is a polymer. The resinous state of such a polyester makes it possible to employ the polyester in a molding operation either alone or in admixture with a filler. A non-resinous liquid composition, such as a diallyl ester, cannot be used in a molding operation because it would be squeezed out of the filler and squirted out of the mold.

A saturated, heat-hardenable polyester, such as glycerol phthalate, is hardened by esterification with elimination of water. A polyester that is hardened by esterification cannot be employed to make a molded article or other solid body, because it is too difficult to remove water from the interior of such a solid body in order to complete the hardening. Even urea-formaldehyde and phenol-formaldehyde compositions tend to give off small amounts of volatiles as they are hardened in a mold. In contrast, a polymerizable unsaturated polyester hardens by polymerization without the evolution of volatiles.

For the foregoing reasons, a polymerizable unsaturated polyester is particularly well adapted for many industrial uses. However, many commercially available fillers which may be used in numerous synthetic resins cannot be used commercially in a polymerizable unsaturated polyester composition because such fillers deleteriously affect such properties as the water resistance, electrical properties and storage stability of a polymerizable unsaturated polyester composition. For example, carbon fillers such as the prevalently used carbon black have been found to be particularly harmful to the storage stability of such a composition, and to interfere seriously with the polymerization of the composition.

The principal object of the invention is the production of a novel unsaturated polyester composition which has improved physical and chemical properties.

Another object of the invention is the production of a novel material comprising a polymerized unsaturated polyester, which contains carbon in a form such that the chemical and physical properties are not harmfully affected. More specific objects and advantages are apparent from the description, which merely discloses and illustrates and is not intended to limit the scope of the invention.

A composition embodying the invention, which has improved physical and chemical properties and which upon polymerization has improved abrasion resistance and lubricating properties, comprises a polymerizable unsaturated polyhydric alcohol-polycarboxylic acid polyester and carbon in the form of graphite.

The present invention is based upon the discovery that graphite when incorporated in a polymerizable polyester not only does not impart the unusually bad physical and chemical properties which other carbon fillers have been found to impart, but actually imparts certain improvements, e. g., in resistance to abrasion and lubricating properties.

Carbon occurs in various allotropic forms, the two main groups of which are crystalline and amorphous carbon. The term "amorphous carbon" includes a wide variety of carbonaceous materials (e. g., lampblack, wood charcoal, coke, gas carbon, and animal charcoal), and is generally employed as an apparent physical classification with no reference to the actual structure of such materials. The amorphous forms of carbon are odorless, tasteless, voluminous black or brownish-black powders which may or may not be lustrous. Although it is understood that most or all of the forms of so-called "amorphous carbon" have a crystalline structure, it is well known that the crystals are so minute that the properties of these forms of carbon are widely different from the properties of the recognized crystalline forms of carbon. In the preparation of resin compositions, the use of crystalline forms such as the diamond is not, of course, practical because of the prohibitive cost and the abrasive quality of the stones. In most instances, the carbon used as a filler in synthetic resins is an amorphous form of carbon. The amorphous carbon filler ordinarily used in synthetic resins is carbon black (i. e., channel black).

Carbon black has been the preferred amorphous carbon filler in the production of synthetic resin compositions because it is cheaply and easily prepared. Carbon black is usually prepared by the dry distillation of hydrocarbons. The air supply is controlled so that the maximum amount of smoke may be developed and collected as soot. The carbon black prepared in this manner has a very fine texture, and any impurities which remain in the carbon black may be driven off by heating the product in the absence of air to a red heat. Thus, carbon black is available commercially in very inexpensive, chemically inert forms, having extremely low ash contents. Moreover, carbon black has been preferred as a carbon filler in synthetic resins because it is obtainable in extremely fine particle size. Since finely divided fillers ordinarily impart better properties to synthetic resins than fillers having a larger particle size, it was believed that a filler with such a fine particle size as carbon black would impart properties to a synthetic resin that would be superior to those properties imparted by carbon fillers in the form of larger particles.

Crystalline carbon has been classified into two groups, namely, diamond (octahedral crystals) and graphite (hexagonal crystals). Graphite may be formed when carbon is dissolved at a high temperature in a metal. As the metal cools, the carbon separates in the form of graphite. Graphite may also be formed by the decomposition of carbides. Graphite deposits are widely distributed in nature, occurring in cracks in limestone and as scattered scales or plates; such deposits contain various impurities which are present in the graphite as thin films on the surfaces of the plates. Many graphite deposits are so contaminated by intimate admixture with other minerals such as quartz and mica that purification is impractical. Due to the impurities present and the conditions under which the crystals were formed, the color of graphite crystals varies from iron-black to lead-grey. Graphite deposits are composed of thin plates of fairly uniform width, ranging up to about 10 cm. in length. The plates may be dull or they may have a bright, metallic luster, but they are always opaque. Usually the structure of the molecules of graphite is considered to consist of a grouping of the carbon atoms in which three atoms lie in the same plane and are connected by equal bonds, and the fourth atom is vertically above or below that plane and is held by a weaker bond, as opposed to the perfectly symmetrical molecule of the diamond. Such a structure accounts for the specific physical and chemical properties of graphite.

The present invention is based upon the discovery that, despite the fact that crystalline carbon in the form of graphite has a larger particle size than amorphous carbon in the form of carbon black, its presence in a synthetic resin comprising a polymerizable unsaturated polyester imparts certain improvements in the properties of the resin, whereas the presence of carbon black in such a synthetic resin is usually so deleterious to the properties of the composition as to make it commercially unusable.

POLYMERIZABLE UNSATURATED POLYESTER

A polymerizable unsaturated polyhydric alcohol-polycarboxylic acid polyester used in the practice of the invention is prepared by reaction of one or more polyhydric alcohols and one or more polybasic acids. The proportion of polyhydric alcohols having more than two hydroxy groups, such as glycerol or pentaerythritol, and the proportion of polycarboxylic acids having more than two carboxy groups, such as citric acid, preferably is small so that in the production of the polyester there may be maximum esterification of the hydroxy and carboxy groups without attainment of excessive viscosity (i. e., through cross-linking). Ordinarily it is desirable that the unsaturated polyester be polymerizable into an infusible or high melting point resin, so that the proportion of unsaturated components should be such that the polyester contains an average of more than one double bond per molecule (for example, there may be an average of eleven or more double bonds in every ten molecules of the polyester); and for the purposes of the instant invention it is to be understood that the term "unsaturated polyester" means a polyester that is polymerizable into an infusible or high melting point resin.

The present invention is applicable to all polymerizable unsaturated polyhydric alcohol-polycarboxylic acid polyesters. A typical example of such a polyester is a product prepared by the reaction of an unsaturated dicarboxylic acid such as maleic, fumaric, itaconic, citraconic or mesaconic acid with a dihydric alcohol such as any polymethylene glycol in the series from ethylene glycol to decamethylene glycol, propylene glycol, any butylene glycol, any polyethylene glycol in the series from diethylene glycol to nonaethylene glycol, dipropylene glycol, any glycerol monobasic acid monoester (in either the alpha or beta position), such as monoformin or monoacetin, any monoether or glycerol with a monohydric alcohol, such as monomethylin or monoethylin, or any dihydroxy alkane in which the hydroxy radicals are attached to carbon atoms that are primary or secondary or both, in the series from dihydroxy butane to dihydroxy decane.

Part of the unsaturated dicarboxylic acid may be replaced by a saturated dicarboxylic acid, such as any normal acid in the series from oxalic acid and malonic acid to sebacic acid, or any benzene dicarboxylic, naphthalene dicarboxylic or cyclohexane dicarboxylic acid, or diglycolic, dilactic or resorcinol diacetic acid. All of the unsaturated acid may be replaced by a saturated acid if a polyhydric alcohol is present whose molecule has two or three free hydroxy groups and consists of an ether of one or two molecules of allyl or methallyl alcohol with one molecule of a polyhydroxy compound such as glycerol, pentaglycerol, pentaerythritol, butantetrol-1,2,3,4, a trihydroxy normal alkane having from four to five carbon atoms such as butantriol-1,2,3 or a monoalkyl ether of pentaerythritol or butantetrol-1,2,3,4, in which the alkyl radical has from one to four carbon atoms and has from one to two hydrogen atoms attached to the same carbon atom as the ether linkage, such as the monomethyl or monoisobutyl ether of pentaerythritol.

In the practice of the invention the preferred polymerizable unsaturated polyhydric alcohol-polycarboxylic acid polyesters are the so-called "linear" polyesters, i. e., those which have very little cross-linking in the polyester molecules, as evidenced by the fact that such polyesters are soluble in solvents such as acetone. Such polyesters are formed mainly by esterification of a dihydric alcohol and a dibasic acid. Of course, such polyesters are really only "substantially" linear since it is not possible to avoid all cross-linking, at least through the unsaturated bonds in the polyester molecules. In fact, a linear (or substantially linear) polyester may be obtained even though in the preparation of such polyester a small proportion of the dihydric alcohol (e. g., less than about 5 mol per cent of the alcohol) is replaced by a polyhydric alcohol containing more than two alcohol radicals, such as glycerol or pentaerythritol, or a small proportion of the dibasic acid (e. g., less than about 5 mol per cent of the acid) is replaced by a polybasic acid containing more than two acid radicals, such as citric acid. The preferred linear polyester for use in the practice of the invention is prepared by carrying out the esterification reaction substantially to completion (i. e., to an acid number of less than about 40) without permitting substantial (addition) polymerization to take place. Although the esterification reaction is usually carried out under an inert gas atmosphere so as to exclude oxygen, various inhibitors may be used to prevent appreciable polymerization of the polyester during the esterification reaction.

In the preparation of the polymerizable unsaturated polyester, any of the usual modifiers such as monobasic acids, monohydric alcohols and natural resin acids may be added. The larger the proportions of monobasic acids and monohydric alcohols, the lower is the average number of acid and alcohol residues in the resulting polyester molecules, and the lower is the viscosity of the polyester. On the other hand, the more nearly equal the molecular proportions of dibasic acid and dihydric alcohol, the greater is the average number of residues in the resulting polyester molecules, and the greater is the viscosity. The proportions of ingredients used are those proportions that produce a polymerizable polyester of the desired viscosity. Other properties of the polyester, such as solubility in various solvents, also may be varied by selecting various reacting ingredients and varying their proportions. The infusibility, hardness and inertness of the product obtained by polymerization of the polyester may be increased by varying the initial reacting ingredients to increase the average number of double bonds per molecule of the polymerizable polyester.

The point to which the reaction of the ingredients is carried in the preparation of the polymerizable polyester is simply that point at which the product has the desired consistency. The consistency or viscosity of the polyester (prepared by reaction under conditions which prevent any appreciable addition polymerization) varies directly with the average number of acid and alcohol residues in the molecule. For example, the average number of residues in the molecule of the polyester may vary from about three to about one hundred twenty.

If desired, the reaction may be expedited by use of an acid substance as a catalyst. Any organic acid, inorganic acid or acid salt that is soluble in the reaction mixture may be employed as a catalyst, but it is desirable that any acid substance used be readily volatile or be of such a character that it has no deleterious effect in the final product. The amount of acid catalyst employed is simply that amount which accelerates the esterification to the desired degree.

The reaction is carried out at a temperature high enough and for a time long enough to secure the desired consistency. An elevated temperature preferably is employed to expedite the reaction, but during the preparation of the polyester, the temperature should not be so high nor the time of reaction so long as to cause substantial polymerization. There is less danger of premature polymerization if an inhibiting agent is added before the esterification is carried out.

Whenever added, an inhibiting agent is used in the proportion required to give the desired degree of inhibiting effect. It may be necessary to use different inhibitors in widely different proportions in order to secure the same inhibiting effect.

Any desired anti-oxidant such as hydroquinone, pyrogallol, tannic acid or any aromatic amine, such as aniline or phenylene diamine may be employed as an inhibitor.

The preparation of the unsaturated polyester preferably is carried out in an atmosphere of an inert gas such as carbon dioxide, nitrogen or the like, in order to prevent cross-linking through addition polymerization as well as to prevent darkening or to make it possible to obtain a pale or colorless product. Bubbling the inert gas through the reacting ingredients is advantageous in that the gas serves the added functions of agitation and of expediting the removal of water formed by the reaction. Exclusion of oxygen is desirable not only because it causes discoloration, but also because it tends to produce premature polymerization at the elevated temperatures used.

The acid number of the product depends upon the degree of reaction and the proportions of acid and alcohol used for the reaction. With equimolecular proportions of dibasic acid and dihydric alcohol, the reaction may be carried to an acid number of about 20. The use of an acid catalyst may make it possible to attain a lower acid number without substantial polymerization.

A polymerizable polyester may be prepared by the following procedure:

A three-necked flask is employed in which 5.4 mols of maleic anhydride and 5.4 mols of diethylene glycol are mixed together. The flask is then fitted with a thermometer, a tube leading to a condenser and an inlet tube through which is introduced a moderate stream of carbon dioxide, and is lowered into an oil bath at a temperature of 210° C. During the subsequent reaction the distillate may be analyzed, and a sufficient amount of the ingredient lost in excess may be added to the flask from time to time to maintain the initial proportions of reacting ingredients. If the only addition is a sufficient amount of the ingredient lost in excess to maintain the initial proportions, the rate of removal of unreacted ingredients gradually decreases and substantially no unreacted ingredients may be left in the composition at the end of the reaction. After 8 hours at such temperature, a polyester is obtained in the form of a stiff liquid having an acid number of 18. If ethylene glycol were substituted for the diethylene glycol in the foregoing procedure, it would be difficult to reduce the acid number below 40 without causing polymerization, and the product would be a very thick gum.

Alternatively, this first procedure, as described in the foregoing paragraph, may be employed except that 1.5 instead of 5.4 mols of maleic anhydride and 1.5 instead of 5.4 mols of diethylene glycol are used together with an amount of hydroquinone equal to 0.2 per cent of the weight of the reacting ingredients and reaction is continued for 6¼ hours. (The terms "per cent" and "part" are used herein to mean per cent and parts by weight unless otherwise specified.) The resulting polyester is a moderately stiff liquid having an acid number of 11.

A further procedure that may be used is the same as the first procedure except that 2 instead of 5.4 mols of maleic anhydride and 2.1 instead of 5.4 mols of diethylene glycol are used; and the reaction is carried out for 4½ hours to produce a stiff liquid having an acid number of 14.

Another type of polymerizable polyester may be prepared by a procedure that is the same as the first procedure except that 3 instead of 5.4 mols of maleic anhydride and 3.3 instead of 5.4 mols of diethylene glycol are used together with an amount of hydroquinone equal to 0.09 per cent of the weight of the reacting ingredients and an amount of p-toluene sulfonic acid equal to 0.18 per cent of the weight of the reacting ingredients; and the reaction is carried out for four hours at 200° C. to produce a stiff liquid having an acid number of 10.6.

As a further alternative, the first procedure may be employed except that the amount of maleic anhydride employed is 6 instead of 5.4 mols; the diethylene glycol is replaced by 6 mols of ethylene glycol; a slower stream of carbon dioxide is used; and the ingredients are kept in an oil bath at 220° C. for 5½ hours. The resulting polyester is a very thick gum having an acid number of 53.

A polymerizable polyester may also be prepared by a procedure that is the same as in the proceding paragraph except that the maleic anhydride is replaced by 5 mols of fumaric acid; the ethylene glycol is replaced by 5 mols of diethylene glycol; and the reaction is continued for 8¼ hours. The resulting polyester is a stiff liquid having an acid number of 23. If in the foregoing procedure the diethylene glycol were replaced by an equimolecular proportion of ethylene glycol and half of the fumaric acid were replaced by an equimolecular proportion of phthalic anhydride, the product would be a hard brittle solid. The substitution of fumaric acid for maleic anhydride increases the length of time required to reach a given acid number at a given temperature. However, the accelerating effect of an acid catalyst upon the esterification is greater when fumaric acid is used. When fumaric acid is employed, other conditions being the same, the resulting polyester tends to be more viscous and greater care is necessary in order to prevent premature polymerization.

As further variation, the first procedure may be used except that the maleic anhydride is replaced by 1.5 mols of fumaric acid; the amount of diethylene glycol employed is 1.5 instead of 5.4 mols; and the temperature is varied between 200 and 220° C. After the reaction has been continued for 2½ hours, the acid number is 73. After 6 hours, the product is a stiff liquid having an acid number of 41.

A polymerizable polyester may also be prepared by a procedure that is the same as that of the preceding paragraph except that p-toluene sulfonic acid (1.5 grams) is added to the initial ingredients; and reaction for only 2½ hours instead of 6 hours is required to produce a stiff liquid having an acid number of 41.

A procedure that may also be used is the same as that of the next to the last paragraph except that the fumaric acid is replaced by 3.3 mols of maleic anhydride; the amount of diethylene glycol used is 3.0 instead of 1.5 mols; 1.5 grams of p-toluene sulfonic acid and 1.3 grams of hydroquinone are added to the initial ingredients; and the reaction is carried out for 3 hours to produce a limpid liquid having an acid number of 26.

A polymerizable polyester may be prepared by a procedure that is the same as the next to the last paragraph except that 3 instead of 1.5 mols of fumaric acid and 3.3 instead of 1.5 mols of diethylene glycol are used; and the reaction is carried out for 3 hours at temperatures ranging from 200–210° C. to produce a stiff liquid having an acid number of 12.

A further procedure that may be used is the same as that of the next to the last paragraph except that the hydroquinone is omitted; and reaction for 5 hours is required to produce a stiff liquid having an acid number of 28.

Another procedure that may be used is the same as the procedure of the next to the last paragraph except that the weight of p-toluene sulfonic acid is equal to 0.18 per cent of the weight of the reacting ingredients; an amount of hydroquinone equal to 0.09 per cent of the weight of the reacting ingredients is added at the start of the reaction; and reaction is carried out at 200° C. for 5 hours to produce a stiff liquid which has an acid number of 10.1.

Polymerization of these materials usually is carried out at temperatures of about 180° to about 210° F. A solution comprising one or more polymerizable unsaturated polyesters and one or more polymerizable monomeric compounds is particularly useful as a binder. Either the unsaturated polyester or the monomeric compound or both may be partially polymerized before the ingredients are mixed. Polymerizable monomeric compounds that are useful for the preparation of such a solution include the polyallyl monomeric esters, examples of which include diallyl phthalate, diallyl oxalate, diallyl diglycolate, triallyl citrate, carbonyl bis-(allyl lactate), maleyl bis-(allyl lactate), fumaryl bis-(allyl lactate), succinyl bis-(allyl lactate), adipyl bis-(allyl lactate), sebacyl bis-(allyl lactate), phthalyl bis-(allyl lactate), fumaryl bis-(allyl glycolate), carbonyl bis-(allyl glycolate), carbonyl bis-(allyl salicylate), tetra-(allyl glycolate) silicate, and tetra-(allyl lactate) silicate.

A polymerizable unsaturated polyester alone or in solution as hereinbefore described may be used in any of the well known industrial polyester compositions, such as polyester molding compounds and polyester casting and adhesive compositions.

A polymerizable unsaturated polyester molding compound is a composition which consists essentially of a filler, a polymerizable polyester (or solution thereof) of the type hereinbefore described and a catalyst for the polymerization of such polyester, with any of the usual molding lubricants, plasticizers and coloring matter. In the molding compound the filler furnishes an improvement in the physical properties of the polymerized polyester, which, in turn, acts as a binder for the filler.

FILLER

The filler in a molding composition embodying the invention may comprise only graphite, but ordinarily it is preferable that it comprise also either a cellulosic material such as alpha cellulose or a mineral material in granular form such as clay, mica, silica or ground glass, or a mineral material in fiber form such as glass fibers or asbestos.

Although the term "asbestos" in commercial use has come to mean only the prevalent "Canadian asbestos," i. e., chrysotile (as the mineral occurring naturally and as the fibers resulting from processing the mineral), strictly speaking "asbestos" is a generic term applicable to silicate minerals having a fibrous structure. The term "asbestos" is used hereinafter in its more strict meaning, i. e., to include not only chrysotile fibers but also other silicate mineral fibers which may be used as fillers in the practice of the invention.

Silicate mineral fibers are obtained principally from two mineral families, viz, serpentines and amphiboles. Both families contain non-fibrous as well as fibrous members. The most important fibrous serpentine is chrysotile, $3MgO.2SiO_2.2H_2O$, a hydrous silicate of magnesium. The amphiboles that may be used in the invention are minerals consisting essentially of silicates of divalent metals, having the general composition: $MO.SiO_2$, wherein M is a divalent metal; but they may also contain small amounts of monovalent metals (e. g., sodium) and trivalent metals (e. g., aluminum or ferric iron). The amphiboles have a different angle of cleavage (and are thereby distinguished) from the pyroxenes, which have substantially the same chemical composition.

The fibers of one or more fibrous amphiboles may be used in the practice of the invention. Examples of such amphiboles include:

Anthophyllite, $(Mg,Fe)O.SiO_2$, essentially a silicate of iron and magnesium, usually with a little aluminum;
Tremolite, $3MgO.CaO.4SiO_2$, a relatively pure silicate of magnesium and calcium;
Actinolite, $3(Mg,Fe)O.CaO.4SiO_4$, similar to tremolite, but containing at least 3 per cent by weight of FeO; and
Others descriptively named mountain leather and mountain cork.

Fibrous amphiboles are available commercially in the form of the crude ore from the mine and in the form of fibers obtained by milling the ore (e. g., in a crusher) and then separating the fibers from the rock residue (e. g., by suction). Ordinarily, the fibers commercially available must be purified further for use in the invention, since such fibers usually contain a substantial amount of mineral impurities which affect deleteriously many of the properties of the products of the invention. The necessity and extent of purification for the purposes of the invention are determined by the nature of the impurities, their effect on the mechanical strength of molded articles and their damaging effect on the mold itself. Amphibole fibers sufficiently purified for the purposes of the invention may be obtained by carrying out a simple flotation process, e. g., by introducing water continuously into the bottom of a vessel equipped with an overflow and containing the amphibole fibers, so that the impurities remain at the bottom of the vessel and the purified fibers float out with the overflowing water. If extreme purity of the fibers is required in a specific embodiment of the invention, tremolite fibers are preferred, since tremolite occurs naturally in a very pure state and often requires little or no further purification.

Fibrous amphiboles occur in various fiber lengths ranging up to as much as 7 inches, but the fiber lengths are reduced substantially in the ordinary milling process. No particular fiber length is required for amphibole fibers used as fillers in the present invention, and the selection of the desired fiber length depends upon the particular embodiment of the invention. For example, if the amphibole fibers are to be used as a filler in a molding compound, the fibers are ground down to the size of ordinary fibrous fillers for use in such compounds, i. e., the fiber lengths of groups No. 6 and No. 7 of the Canadian Asbestos classification, at which the fibers appear to the naked eye to be similar in form to sawdust.

Polyester molding compositions embodying the invention which contain a filler comprising graphite and mineral fibers may be polymerized to obtain articles which ordinarily have better water resistance, electrical properties and strength than articles embodying the invention in which the filler comprises graphite and cellulose. Amphibole fibers are preferred over mineral fibers such as chrysotile fibers, since the amphiboles impart superior water resistance and electrical properties.

In the practice of the invention, it has been found that the best all-around results are obtained when a filler comprising mineral fibers, kaolin and graphite is used. A substantial proportion of the mineral fiber filler may be replaced by kaolin without appreciably altering the improvement in properties obtained with the mineral fibers and graphite. Kaolin not only is less expensive than asbestos but also imparts an improvement in the hardness, strength and surface finish of the polymerized material. A preferred form of kaolin for use in the invention is a commercial product known as "Georgia clay" (e. g., "Witco Ideal").

In the practice of the invention graphite may be considered a portion of the filler since it functions physically as a part of the filler. One of the most amazing aspects of the present invention resides in the fact that the combination of graphite with cellulose, mineral fibers, non-fibrous minerals or mixtures thereof may be used as a filler to impart substantially greater abrasion resistance to the polyester composition than any one of such ingredients used alone. Furthermore, graphite has essentially no deleterious effects upon the other physical and chemical properties of the polyester composition.

CATALYSTS

Since the polymerizable polyester is fusible and plastic at relatively low temperatures, it is possible to adjust the amounts of catalyst and inhibiting agent so that the hardening at such temperature takes place at a reasonable rate to allow ample opportunity for shaping and molding of the composition. In this manner molding compounds may be produced which are fast curing, gas free and adapted to complicated moldings (e. g., clock cases).

The preferred catalyst for use in the practice of the invention is benzoyl peroxide, but any other organic peroxide (not containing polymerization-inhibiting radicals), such as succinyl peroxide, t-butyl perbenzoate, di-t-butyl perphthalate, acetyl peroxide, peracetic acid, perbenzoic acid, toluyl peroxide, p-bromo-benzoyl peroxide, anisoyl peroxide, chloroacetyl peroxide, acetyl benzoyl peroxide, diacetyl peroxide and furoyl peroxide; or any organic ozonide (not containing polymerization-inhibiting radicals), such as di-isopropylene ozonide or di-isobutylene ozonide; or a mixture of such substances; may be used as the curing catalyst.

PREPARATION OF ABRASION-RESISTANT COMPOSITION

In the production of a molding compound embodying the invention the mixing of the filler with the polymerizable polyester may be carried out by any of the known methods. If the polyester is very viscous, it may be necessary to incorporate the filler in the polyester in a heated two-roll (differential speed) rubber mill or it may be desirable to heat the polyester in order to reduce the viscosity sufficiently to permit the use of other mixing procedures. Ordinarily the viscosity of the polyester is such that kneading or equivalent mixing apparatus (e. g., Banbury mixer) may be used satisfactorily. In some cases it may be desirable to dilute the polyester with a solvent in order to facilitate mixing with the filler. In the production of casting and adhesive compositions embodying the invention the mixing of the filler with the polymerizable polyester may be carried out by any of the known methods, for example, by heating the polyester to reduce its viscosity, thus permitting the use of the ordinary mixing methods hereinbefore described for the preparation of a molding compound.

As hereinbefore stated, although graphite may be the only filler used in the practice of the invention, it is usually preferable that it be used in admixture with other fillers, as hereinbefore described. The full benefit of the use of graphite in the practice of the invention is obtained simply by incorporating the graphite in the polyester in the same manner as any filler, according to the procedures hereinbefore described. The graphite may be incorporated in the polyester alone or as a mixture with the fillers hereinbefore mentioned. In determining the total amount of filler used, the amount of graphite is added to the amount of other filler used, so that the proportion of the total filler used in the practice of the invention is within a range hereinafter described.

The function of the polyester in a molding compound is that of a binder. The proportion of filler varies with the specific characteristics of the binder and filler. The proportion of a filler in a molding compound embodying the invention which comprises graphite and cellulose may range from the minimum amount capable of appreciably improving the physical properties of the hardened product (i. e., about 1 per cent) to the maximum proportion which may be held together satisfactorily by the polyester binder in the hardened product (i. e., about 80 per cent). Generally speaking, the preferred range for a graphite-containing cellulosic filler is from about 40 per cent to about 75 per cent of the molding compound, and the best all-around results are obtained at about 55 per cent to about 60 per cent. The molding compounds containing very small amounts of a cellulosic filler are usually special compounds in which a mixed filler of a cellulosic material and a mineral material is employed. It may be desirable to use a mixed filler of a cellulosic material and a mineral material such as silica or asbestos along with graphite in a cold molding composition, for example, in which the per cent of total filler in the composition may be as high as 90 per cent.

It may be desirable to use mineral material exclusively in combination with graphite as the filler in a molding compound embodying the invention, particularly when very high water resistance is required. The proportion of a graphite-containing mineral filler may range from the minimum amount required to improve appreciably the physical properties of the hardened product (i. e., about 5 per cent) to the maximum proportion which may be held together or bound satisfactorily by the polyester (i. e., about 85 per cent). Generally speaking, the preferred range for graphite-containing mineral fillers is from about 60 per cent to about 70 per cent of filler in the molding compound, and the best all-around results are obtained in the upper portion of such range.

In adhesive compositions the proportion of a graphite-containing cellulose filler to the polyester may range from as low as about 1:100 to as high as about 1:4, the preferred proportions being from about 1:30 to about 1:5. The proportion of a graphite-containing mineral filler to the polyester may range from as low as about 1:100 to as high as about 1:1, the preferred proportions being from about 1:5 to about 1:2.

The proportion of kaolin to asbestos fibers in the filler mixture may range from the minimum proportion at which the effect of kaolin is noticeable (i. e., about 1:100) to the maximum proportion at which the effect of the fibers is noticeable (i. e., about 6:1), the preferred proportion being in the upper portion of the range, for economic reasons. The optimum results are obtained at a kaolin to fiber ratio ranging from about 1:1 to about 2:1.

The proportion of graphite used in the practice of the present invention may range from the minimum proportion which imparts a noticeable improvement in abrasion resistance (i. e., about 0:1 per cent of the total composition) to the proportion above which graphite starts to impart a deleterious effect on the physical or chemical properties of the polymerized unsaturated polyester (i. e., about 10 per cent of the total composition).

Since in the practice of the invention it is preferable to include kaolin also as a part of the filler, and since kaolin is non-fibrous, the maximum preferred ratio of the amount of kaolin plus graphite to the amount of mineral fiber filler used is the same as the hereinbefore stated maximum ratio of the amount of kaolin to the amount of mineral fiber filler used (i. e., about 6:1). Although the proportion of graphite may range from about 0.1 per cent to about 10 per cent of the total composition, it preferably is within the range from 0.5 to 4 per cent of the total composition. It is most desirable that the proportion of graphite be from 1 to 2 per cent of the total composition. A storage stability of approximately two weeks may be obtained with catalyst-containing compositions embodying the invention in which the composition comprises from 1 to 2 per cent of graphite. The term "storage stability of approximately two weeks" as used herein applies to a composition containing the full amount of catalyst required for hardening at molding temperatures which, upon standing at atmospheric temperatures for approximately two weeks, contains no hard lumps of material and can be cured completely at molding temperatures in a very short time to a hard article that is resistant to water and to deterioration or cracking by heat.

In the practice of the invention a solution comprising one or more polymerizable unsaturated polyesters and one or more polymerizable monomeric compounds is particularly advantageous, because the polyester has desirable physical properties and hardens very rapidly, whereas the presence of the monomeric compound causes the polymerized product to be much more water resistant and insoluble. Moreover, the combination (solution) of the polyester and the monomeric compound usually polymerizes much more rapidly than either of such substances alone. Such a solution usually contains about 5 per cent to about 35 per cent of the polymerizable monomeric compound and about 95 per cent to about 65 per cent of the polymerizable polyester.

A solution similar to that obtained by dissolving the polyester in a monomeric compound hereinbefore described may be prepared by dissolving the polyester, before use, in a polymerizable substance such as styrene, vinyl acetate, methylmethacrylate or methylacrylate.

The proportion of curing catalyst used in the practice of the invention is simply the proportion that causes the composition to polymerize at the desired rate, and as the term "catalyst" implies, such proportion is the usual catalytic amount, i. e., ranging from about 0.01 per cent to about 5 per cent of the composition. The preferred proportion of curing catalyst varies with the different catalysts, and the amount of any particular curing catalyst required to produce a given rate of hardening may vary also with variations in the nature of the polymerizable composition. For example, a polyester prepared from maleic anhydride and diethylene glycol, in a molding compound of the invention containing about 3 per cent of benzoyl peroxide, may be cured at approximately the same rate as a molding compound, containing a similar polyester prepared from fumaric acid and diethylene glycol, in which the proportion of benzoyl peroxide is about 0.5 per cent.

If the binder used in the practice of the invention comprises a viscous polymerizable substance and a less viscous polymerizable substance, the polymerization catalyst may be dissolved in the less viscous polymerizable substance before the two substances are mixed. On the other hand, it is often desirable to disperse the polymerization catalyst in the filler by grinding it with the filler in a ball mill, for example, before the fibers are mixed with the polyester. In some cases a filler may be mixed with a solution (in a volatile solvent) of the polymerization catalyst and dried before the filler is mixed with the polyester.

When the present method is carried out in the production of a molding compound or a casting composition, plasticizers and lubricants may be incorporated if desired.

The superiority of the abrasion resistance of articles molded from graphite-containing polymerizable polyester compositions embodying the invention may be demonstrated by tests carried out as follows:

A polymerizable unsaturated linear polyester is prepared by the procedure hereinbefore described from a charge consisting of 1.0 mol of maleic anhydride, 0.85 mol of monoethylene glycol, 0.2 mol of propylene glycol and an amount of hydroquinone equal to 0.06 per cent of the charge. The charge is heated to a temperature of 230 degrees C. (over a period of two hours) and is then held at temperatures ranging between 230 degrees C. and 235 degrees C. for five more hours. The resulting polyester has an acid number of about 30.

A composition, A, is prepared as follows: A polymerizable unsaturated polyester (129.8 grams of a polyester prepared as described in the preceding paragraph), a polymerizable monomeric compound (14.4 grams of diallylphthalate), and a catalyst paste consisting of tricresyl phosphate (2.9 grams) and benzoyl peroxide (2.9 grams) are mixed to form a solution. The solution so prepared, a filler consisting of 340 grams of anthophyllite fibers and 10 grams of "Witco" uncompressed carbon black, and a lubricant (10 grams of zinc stearate) are mixed and heated in a Banbury mixer at a temperature of about 50 degrees C. for ten minutes. The resulting composition is removed in sheets, is allowed to solidify fully while at a temperature between 80 and 90 degrees F., and then is granulated in a high speed cutter to a maximum particle diameter of about 1/8 inch.

A composition, B, is prepared and granulated by the procedure described in the preceding paragraph except that the filler used consists of 310 grams of anthophyllite fibers and 40 grams of graphite powder (G-64 Graphite from Fischer Scientific Company) and the temperature is maintained at about 58 degrees C. during the mixing in the Banbury mixer.

A composition, C, is prepared and granulated by the procedure described in the preceding paragraph except that the filler used consists of 340 grams of kaolin ("Witco Ideal") and 10 grams of graphite.

For the sake of comparison a polymerized unsaturated polyester composition containing no carbon filler, D (a control) is prepared as follows: A polymerizable unsaturated polyester (85 parts of the polyester used in the preparation of compositions A, B, and C) is mixed thoroughly with diallyl phthalate (15 parts) and a catalyst paste consisting of tricresyl phosphate (2 parts) and benzoyl peroxide (2 parts) to form a solution. The solution so obtained (25 parts) is mixed with a filler consisting of 35 parts of anthophyllite fibers and 45 parts of kaolin, and a lubricant (2 parts of zinc stearate). The resulting polyester composition is granulated by the procedure described for composition A.

Composition A which contains a filler comprising carbon black becomes a rubbery mass at molding temperatures and cannot be molded into a coherent finished article that can be tested for resistance to abrasion. Compositions B, C and D are compression molded for one minute under a pressure of 17,000 pounds per square inch of projected area in a mold heated with steam at 75 pounds per square inch gauge pressure, to obtain disks having a diameter of six inches and a thickness of ⅛ inch. The disks so obtained are tested for resistance to abrasion by means of a Taber Abrader (i. e., a portable instrument in which two abrasive wheels which are made of a rubber composition containing an abrasive can be set in such a way as to cause a frictional drag when allowed to run over molded disks). The coarse wheels of the abrader are ground over the surface of weighed disks of compositions B, C and D. After 500 complete turns of the abrasive wheels at a constant speed, the disks are again weighed. The loss in weight of the disks, i. e., the amount of the composition which is ground off the disks by the wheels, is a measure of the resistance to abrasion of the composition. Thus, the smaller the loss in weight, the greater is the resistance to abrasion of the composition being tested. Before testing each disk, the wheels of the abrader are permitted to make 24 complete turns over trimming wheels, so that the surface of the wheels is clean and abrasive and the tests on the various compositions are performed under equal conditions.

The results of abrasion resistance tests on two disks molded from each of the compositions B, C and D are shown in Table I.

*Table I*

| Composition | Abrasion Resistance (Weight loss in grams) | |
| --- | --- | --- |
| | Disk 1 | Disk 2 |
| B | 0.030 | 0.030 |
| C | 0.045 | 0.030 |
| D (Control) | 0.066 | 0.069 |

As the results in Table I indicate, compositions of the invention (B and C) have abrasion resistance that is superior to that of a polymerized unsaturated polyester composition which contains no graphite (D). A polymerizable unsaturated polyester composition which contains a very small amount of a carbon filler in the form of carbon black (A) is not commercially useful as a molding composition, since it cannot be cured to form a coherent finished article.

The following examples illustrate the practice of the invention:

EXAMPLE 1

A material embodying the invention is prepared by the following procedure:

A polymerizable unsaturated linear polyester is prepared by the procedure hereinbefore described from a charge consisting of 1.0 mol of maleic anhydride, 0.85 mol of monoethylene glycol, 0.2 mol of propylene glycol and an amount of hydroquinone equal to 0.06 per cent of the charge. The charge is heated to a temperature of 230 degrees C. (over a period of two hours) and is then held at temperatures ranging between 230 degrees C. and 235 degrees C. for five more hours to obtain a polymerizable polyester having an acid number of about 30.

A polymerizable unsaturated polyester (129.8 grams of a polyester prepared as described in the preceding paragraph), a polymerizable monomeric compound (14.4 grams of diallyl phthalate) and a catalyst paste consisting of tricresyl phosphate (2.9 grams) and benzoyl peroxide (2.9 grams) are mixed to form a solution. The resulting solution is mixed with a filler consisting of anthophyllite fibers (340 grams) and graphite powder (10 grams of G-64 Graphite from Fischer Scientific Company), and a lubricant, (10 grams of zinc stearate), and the mixture is kneaded in a Banbury mixer at a temperature of about 50 degrees C. for about ten minutes. The resulting composition is removed in sheets, is allowed to solidify fully while at a temperature between 80 and 90 degrees F. and then is granulated in a high speed cutter to a maximum particle diameter of about ⅛ inch. The granulated composition is compression molded to produce articles of dimensions suitable for physical testing. The loss in weight of a molded disk of the composition, having a diameter of six inches, in an abrasion resistance test (as hereinbefore described) is 0.055 gram.

EXAMPLE 2

The procedure described in Example 1 is repeated except that the filler used consists of 330 grams of anthophyllite fibers and 20 grams of graphite. The loss in weight of a molded disk of the composition, having a diameter of six inches, in an abrasion resistance test (as hereinbefore described) is 0.055 gram.

EXAMPLE 3

The procedure described in Example 1 is repeated except that the filler used consists of 330 grams of chrysotile fibers and 20 grams of graphite, and the mixture is heated in the Banbury mixer at a temperature of 58 degrees C. for ten minutes. The loss in weight of a molded disk of the composition, having a diameter of six inches, in an abrasion resistance test (as hereinbefore described) is 0.005 gram.

EXAMPLE 4

The procedure described in Example 3 is repeated except that the filler used consists of 330 grams of cellulose and 20 grams of graphite. The loss in weight of a molded disk of the composition, having a diameter of six inches, in an abrasion resistance test (as hereinbefore described) is 0.005 gram.

EXAMPLE 5

(*a*) The procedure described in Example 3 is repeated except that the filler used consists of 330 grams of kaolin ("Witco Ideal") and 20 grams of graphite. The loss in weight of a molded disk of the composition, having a diameter of six inches, in an abrasion resistance test (as hereinbefore described) is 0.020 gram.

(*b*) The procedure described in (*a*) above is repeated except that the amount of kaolin used is 310 grams and the amount of graphite used is 40 grams. The loss in weight of a molded disk of the composition, having a diameter of six inches, in an abrasion resistance test (as hereinbefore described) is 0.010 gram.

EXAMPLE 6

The procedure described in Example 5 (*a*) is repeated except that the filler used consists of 100 grams of glass flock, 225 grams of kaolin and 20 grams of graphite. An abrasion resistance test (as hereinbefore described) on a molded disk of the composition having a diameter of six inches results in no loss in weight of the disk.

The presence of graphite in compositions of the invention imparts superior resistance to abrasion with essentially no deleterious effect on the physical or chemical properties (e. g., water resistance) of such compositions. (Water resistance varies with the amount of moisture that an article is capable of absorbing, because the degree of deterioration upon exposure to moisture varies with the amount of water absorbed.) The water resistance of molded test pieces of the compositions prepared as described in the preceding examples is shown in Table II (below). The water resistance tests employed, which are standard tests for plastic materials and are considered to be capable of showing generally the water resistance characteristics that are important in industrial materials of this class, are conducted as follows: Samples of the granulated compositions are molded for one minute under a pressure of 17,000 pounds per square inch of projected area in a mold heated with steam at 75 pounds per square inch gauge pressure to form two-inch diameter disks having a thickness of about ⅛ inch. Each disk is immersed in hot or cold water for a given period of time, and the water absorption is measured as the gain in weight (in grams) during immersion. In Table II (below) the example number (line 1) identifies the method of preparing the composition from which the test disk is molded. The water absorption (in grams) is given for tests in which the test pieces are immersed in boiling water for one hour (line 2), or in cold water for one day (line 3), two days (line 4) or seven days (line 5).

*Table II*

| 1. Example No. | 1 | 2 | 3 | 4 | 5a | 5b | 6 |
| --- | --- | --- | --- | --- | --- | --- | --- |
| 2. Boiling Water Absorption | 0.060 | 0.095 | 0.145 | 0.205 | 0.085 | 0.080 | 0.095 |
| 3. Cold Water Absorption (1 day) | 0.020 | 0.040 | 0.100 | 0.170 | 0.045 | 0.060 | 0.045 |
| 4. Cold Water Absorption (2 days) | 0.035 | 0.065 | 0.160 | 0.270 | 0.070 | 0.085 | 0.070 |
| 5. Cold Water Absorption (7 days) | 0.090 | 0.145 | 0.220 | 0.435 | 0.140 | 0.165 | 0.140 |

As the results in Table II indicate, compositions embodying the invention in which the filler comprises mineral fibers (Examples 1, 2 and 3) possess better water resistance than similar compositions in which the filler comprises cellulose (Example 4). Compositions of the invention in which the mineral fibers are amphibole fibers (i. e., anthophyllite fibers, Examples 1 and 2) are superior in water resistance to compositions in which the mineral fibers are chrysotile fibers (Example 3).

A composition, F, which is similar to the composition prepared as described in Example 1 (hereinafter referred to as E) except that the filter consists entirely of anthophyllite fibers may be prepared as follows:

A polymerizable unsaturated polyester is prepared by the procedure hereinbefore described from a charge consisting of 1.05 mols of monoethylene glycol, 1 mol of maleic anhydride and an amount of hydroquinone equal to 0.04 per cent of the charge. The charge is heated to 220° C. (over a period of two hours), and is held between 220° C. and 226° C. for six more hours. The resulting polyester (95 parts), which has an acid number of about 35, is cooled to 60–70° C. and is mixed thoroughly with diallyl phthalate (5 parts) and a paste of tricresyl phosphate (1.5 parts) and benzoyl peroxide (1.5 parts), as a catalyst, to form a solution. A filler (230 parts of anthophyllite fibers), the polymerizable polyester solution, and a lubricant (6 parts of zinc stearate) are mixed and heated in a Banbury mixer at a temperature of about 50 degrees C. for about ten minutes. The resulting composition is granulated, molded into two-inch diameter disks having a thickness of about ⅛ inch, and tested for water resistance by the procedures hereinbefore described. A comparison of the water resistance of composition F with the water resistance of composition E (prepared as described in Example 1, in which the filter comprises graphite as well as anthophyllite fibers) is shown in Table III (below).

*Table III*

| Composition | E | F |
| --- | --- | --- |
| Boiling Water Absorption | 0.060 | 0.080 |
| Cold Water Absorption (1 day) | 0.020 | 0.025 |
| Cold Water Absorption (2 days) | 0.035 | 0.045 |
| Cold Water Absorption (7 days) | 0.090 | 0.105 |

As the results in Table III indicate, the presence of graphite in a polymerized unsaturated polyester composition embodying the invention has essentially no deleterious effect on the water resistance of the composition.

I claim:

1. A hardenable composition comprising 0.1 to 10 per cent of its weight of graphite and a polymerizable linear unsaturated polycarboxylic acid-polyhydric alcohol polyester wherein at least 95 per cent of the polyhydric alcohol residues are derived from a dihydric alcohol and at least 95 per cent of the polycarboxylic acid residues are derived from a dicarboxylic acid.

2. A molding compound comprising, as a binder, a polymerizable linear unsaturated polycarboxylic acid-polyhydric alcohol polyester wherein at least 95 per cent of the polyhydric alcohol residues are derived from a dihydric alcohol and at least 95 per cent of the polycarboxylic acid residues are derived from a dicarboxylic acid, and a filler that comprises graphite, in an amount that is 0.1 to 10 per cent of the weight of the molding compound.

3. A molding compound comprising, as a binder, a polymerizable linear unsaturated polycarboxylic acid-polyhydric alcohol polyester wherein at least 95 per cent of the polyhydric alcohol residues are derived from a dihydric alcohol and at least 95 per cent of the polycarboxylic acid residues are derived from a dicarboxylic acid, and a filler that comprises mineral fibers and graphite in an amount that is 0.1 to 10 per cent of the weight of the molding compound, for improving the abrasion resistance attainable upon polymerization of the compound.

4. A molding compound comprising, as a binder, a polymerizable linear unsaturated polycarboxylic acid-polyhydric alcohol polyester wherein at least 95 per cent of the polyhydric alcohol residues are derived from a dihydric alcohol and at least 95 per cent of the polycarboxylic acid residues are derived from a dicarboxylic acid, and a filler that comprises kaolin and graphite in an amount that is 0.1 to 10 per cent of the weight of the molding compound, for improving the abrasion resistance attainable upon polymerization of the compound.

5. A molding compound comprising, as a binder, a polymerizable linear unsaturated polycarboxylic acid-polyhydric alcohol polyester wherein at least 95 per cent of the polyhydric alcohol residues are derived from a dihydric alcohol and at least 95 per cent of the polycarboxylic acid residues are derived from a dicarboxylic acid, and a filler that comprises mineral fibers, kaolin and graphite in an amount that is 0.1 to 10 per cent of the weight of the molding compound, for improving the abrasion resistance attainable upon polymerization of the compound, the weight ratio of (a) kaolin plus graphite to (b) mineral fibers ranging from 1:100 to 6:1.

6. A method of producing an abrasion-resistant material from a composition comprising a polymerizable linear unsaturated polycarboxylic acid-polyhydric alcohol polyester wherein at least 95 per cent of the polyhydric alcohol residues are derived from a dihydric alcohol and at least 95 per cent of the polycarboxylic acid residues are derived from a dicarboxylic acid, that comprises the steps of (1) incorporating intimately therein graphite to improve the abrasion resistance attainable upon polymerization, before substantial polymerization of the polyester, and then (2) hardening the polyester by polymerization.

7. A molding compound comprising (1), as a binder, a polymerizable linear unsaturated polycarboxylic acid-polyhydric alcohol polyester wherein at least 95 per cent of the polyhydric alcohol residues are derived from a dihydric alcohol and at least 95 per cent of the polycarboxylic acid residues are derived from a dicarboxylic acid, (2), as a polymerization catalyst therefor, a compound of the class consisting of organic peroxides and organic ozonides and (3) a filler that comprises graphite in an amount that is 0.1 to 10 per cent of the weight of the molding compound.

8. A molding compound comprising (1), as a binder, a solution of (a) 65–95 parts of a polymerizable linear unsaturated polycarboxylic acid-polyhydric alcohol polyester wherein at least 95 per cent of the polyhydric alcohol residues are derived from a dihydric alcohol and at least 95 per cent of the polycarboxylic acid residues are derived from a dicarboxylic acid and (b) 5–35 parts of a copolymerizable monomeric polyallyl ester, (2), as a polymerization catalyst therefor, a compound of the class consisting of organic peroxides and organic ozonides and (3) a filler that comprises amphibole fibers, kaolin, and graphite in an amount that is one to two per cent of the weight of the molding compound, the weight ratio of (a) kaolin plus graphite to (b) amphibole fibers ranging from 1:100 to 6:1.

9. A molding compound as claimed in claim 8 wherein the amphibole fibers are anthophyllite fibers.

10. A molding compound comprising (1), as a binder, a polymerizable linear unsaturated polycarboxylic acid-polyhydric alcohol polyester wherein at least 95 per cent of the polyhydric alcohol residues are derived from a dihydric alcohol and at least 95 per cent of the polycarboxylic acid residues are derived from a dicarboxylic acid, (2), as a polymerization catalyst therefor, a compound of the class consisting of organic peroxides and organic ozonides and (3) a filler that comprises cellulose fibers, and graphite in an amount that is one to two per cent of the weight of the molding compound.

MAURICE H. BIGELOW.

REFERENCES CITED

The following references are of record in the file of this patent:

UNITED STATES PATENTS

| Number | Name | Date |
| --- | --- | --- |
| 2,134,950 | Offutt | Nov. 1, 1938 |
| 2,386,095 | Edgar et al. | Oct. 2, 1945 |
| 2,510,727 | Sussenbach | June 6, 1950 |
| 2,542,808 | Gilman et al. | Feb. 20, 1951 |